United States Patent [19]

Tuckey

[11] Patent Number: 5,406,922
[45] Date of Patent: Apr. 18, 1995

[54] SELF-CONTAINED ELECTRIC-MOTOR FUEL PUMP WITH OUTLET PRESSURE REGULATION

[75] Inventor: Charles H. Tuckey, Cass City, Mich.

[73] Assignee: Walbro Corporation, Cass City, Mich.

[21] Appl. No.: 177,182

[22] Filed: Dec. 30, 1993

Related U.S. Application Data

[63] Continuation of Ser. No. 949,974, Sep. 24, 1992, abandoned.

[51] Int. Cl.⁶ ............................................. F02M 37/04
[52] U.S. Cl. .................................. 123/497; 123/41.31
[58] Field of Search ............ 123/497, 499, 494, 41.31, 123/495

[56] References Cited

U.S. PATENT DOCUMENTS

| | | |
|---|---|---|
| 4,728,264 | 3/1988 | Tuckey . |
| 4,756,291 | 7/1988 | Cummins ............................ 123/497 |
| 4,789,308 | 12/1988 | Tuckey . |
| 4,800,859 | 1/1989 | Sagisaka ............................ 123/497 |
| 4,919,102 | 4/1990 | Iwabuchi ............................ 123/497 |
| 4,920,942 | 5/1990 | Fujimori ............................ 123/497 |
| 4,951,636 | 8/1990 | Tuckey et al. . |
| 5,120,201 | 6/1992 | Tuckey et al. . |
| 5,133,323 | 7/1992 | Treusch ............................ 123/497 |
| 5,148,792 | 9/1992 | Tuckey ............................ 123/497 |

Primary Examiner—Carl S. Miller
Attorney, Agent, or Firm—Barnes, Kisselle, Raisch, Choate, Whittemore & Hulbert

[57] ABSTRACT

A fuel delivery system for an internal combustion engine that includes a fuel supply, an electric-motor pump for feeding fuel under pressure from the supply to an engine, and electronic control circuitry for applying electrical power to the pump. The control circuitry includes a pressure sensitive switch coupled to the pump and responsive to pump outlet pressure for switching between conductive and non-conductive switch conditions at a preselected pump outlet pressure. A pulse width modulation amplifier is coupled to the switch for applying pulsed d.c. energy to the pump at a first average voltage level when the pressure switch is in one condition, and at a second lesser but non-zero level when the pressure switch is in the other condition. In this way, electrical power is applied to the pump motor at a reduced level when pump outlet pressure exceeds the threshold level of the pressure switch.

11 Claims, 1 Drawing Sheet

SELF-CONTAINED ELECTRIC-MOTOR FUEL PUMP WITH OUTLET PRESSURE REGULATION

This is a continuation of application Ser. No. 07/949,974, filed Sep. 24, 1992, now abandoned.

The present invention is directed to fuel delivery systems for internal combustion engines, and more particularly to a self-contained electric-motor fuel pump with outlet pressure regulation.

BACKGROUND AND OBJECTS OF THE INVENTION

U.S. Pat. No. 4,728,264 discloses a fuel delivery system for an internal combustion engine that includes an electric-motor fuel pump for delivering fuel under pressure from a fuel tank or supply to an engine. A pressure switch is coupled to the fuel line between the pump outlet and the engine, and is responsive to fuel pressure for opening a pair of switch contacts when such fuel pressure exceeds a predetermined threshold, and closing the contacts when fuel pressure is below such threshold. The pressure switch may be separate from or incorporated into the motor/pump. The contacts of the pressure switch are connected to apply d.c. power to the fuel pump motor when the switch contacts are closed, and to remove power from the pump motor when the contacts are open. In this way, electrical power is applied to the pump motor when pump outlet pressure is below the threshold of the pressure switch, and is removed when outlet pressure exceeds switch threshold pressure.

U.S. Pat. No. 4,789,308 discloses a fuel delivery system for an internal combustion engine in which outlet pressure of an electric-motor fuel pump is monitored by a pressure sensor mounted on the pump outlet end cap. The sensor, which includes a magnet biased by a spring against outlet pressure within the pump housing and a Hall sensor responsive to magnet position, provides a continuous output within the range of the sensor. D.c. power is applied to the pump motor as a continuous function of the sensor output signal.

U.S. Pat. No. 4,951,636 discloses a fuel delivery system in which a pressure sensor is responsive to a pressure differential between fuel pressure at the engine and engine air intake manifold pressure for controlling a pulse-width modulated drive signal applied to the pump motor. The pressure sensor and the motor drive electronics are mounted within a module that includes a passage for fuel flow to the engine so that heat generated by the drive electronics is at least partially dissipated to the fuel.

Although the fuel delivery systems disclosed in the noted patents, all of which are assigned to the assignee hereof, address problems theretofore extant in the art, further improvements remain desirable. A general object of the present invention is to provide a fuel delivery system with pump outlet pressure regulation having improved stability over a wide range of operating conditions. Another object of the invention is to provide a fuel delivery system, and particularly a self-contained electric-motor fuel pump with outlet pressure regulation adapted for use in such system, that is economical to implement in mass production, and is reliable over an extended operating lifetime.

SUMMARY OF THE INVENTION

A fuel delivery system for an internal combustion engine in accordance with a presently preferred embodiment of the invention includes a fuel supply, an electric-motor pump for feeding fuel under pressure from the supply to an engine, and electronic control circuitry for applying electrical power to the pump. The control circuitry includes a pressure sensitive switch coupled to the pump and responsive to pump outlet pressure for switching between conductive and non-conductive switch conditions at a preselected pump outlet pressure. A pulse width modulation amplifier is coupled to the switch for applying pulsed d.c. energy to the pump at a first average voltage level when the pressure switch is in one condition, and at a second lesser level when the pressure switch is in the other condition. In this way, electrical power is applied to the pump motor at a reduced but non-zero level when pump outlet pressure exceeds the threshold level of the pressure switch.

In the preferred embodiment of the invention, the electric-motor pump comprises an integral assembly in which the pressure switch and control electronics are carried by the motor/pump outlet end cap. The pressure switch comprises a valve having a valve seat, a valve element and a spring urging the valve element toward the seat against the force of fuel pressure within the pump housing. The valve spring and seat are connected to the control electronics through a resistor for limiting current through the valve element/seat contacts of the switch. The outlet pressure threshold of the switch is determined by the coil spring. Preferably, fuel flowing through the valve/switch is returned to the fuel supply, in effect bypassing the pump outlet. A filter is disposed between the valve seat and the interior of the pump housing to prevent collection of dirt or debris between the valve element and the seat. Most preferably, the pump drive electronics are mounted on the outlet end cap for heat dissipation to the fuel that bypasses the fuel outlet.

BRIEF DESCRIPTION OF THE DRAWINGS

The invention, together with additional objects, features, and advantages thereof, will be best understood from the following description, the appended claims and the accompanying drawings in which:

DETAILED DESCRIPTION OF PREFERRED EMBODIMENTS

Figure 1:
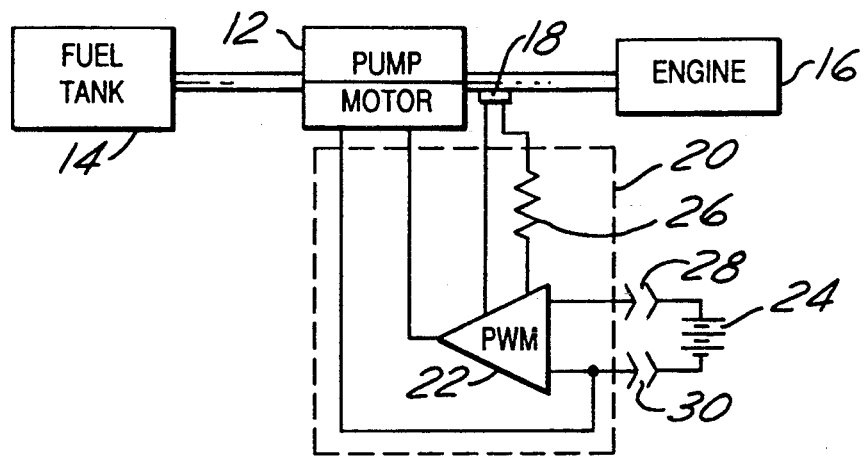
FIG. 1 is a schematic diagram of a fuel delivery system in accordance with a presently preferred embodiment of the invention.

FIG. 1 illustrates a fuel delivery system 10 in accordance with a presently preferred embodiment of the invention as comprising an electric-motor fuel pump 12 for delivering fuel under pressure from a fuel supply or tank 14 to an engine 16. A pressure sensor 18 is coupled to pump 12 so as to be responsive to pump outlet pressure. Sensor 18 is connected to control electronics 20, which includes a pulse width modulation amplifier 22 for applying pulsed d.c. electrical power to the pump motor from the vehicle battery or electrical system 24. A resistor 26 is connected between amplifier 22 and sensor 18 for limiting current conducted through the sensor. Control electronics 20 receives electrical power from battery 24 through a pair of electrical contacts 28,30.

Figures 2, 3:
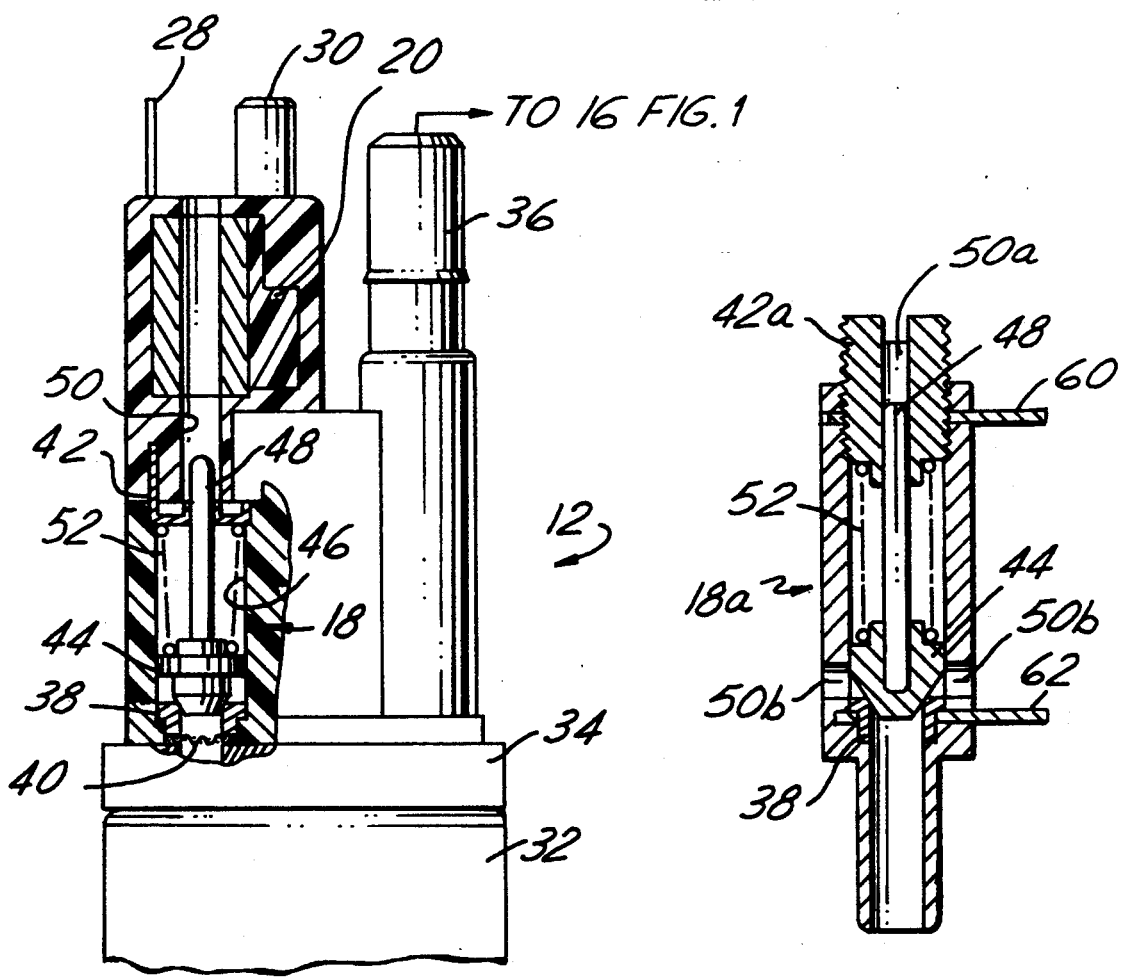
FIG. 2 is a fragmentary partially sectioned elevational view of a self-contained electric-motor fuel pump in accordance with a presently preferred embodiment of the invention.
FIG. 3 is a sectional view of an alternative embodiment of the pressure control valve/switch illustrated in FIG. 2.

FIG. 2 illustrates electric-motor fuel pump 12 as including a housing 32 in which the pump motor is contained. An end cap 34 is mounted on one end of housing 32, from which an outlet fitting 36 projects for connection by a suitable fuel line to engine 16 (FIG. 1). As shown in greater detail in above-noted U.S. Pat. No. 4,789,308, fuel is drawn from the fuel tank and fed to outlet fitting 36 in such a way that the fuel is at outlet pressure within housing 32.

Pressure sensor 18 comprises a pressure control valve that includes a valve seat 38 of electrically conductive construction carried by outlet end cap 34 and opening through a screen 40 to the interior of housing 32. A retainer 42 of electrically conductive construction is also carried by end cap 34 coaxially spaced from valve seat 38. A valve element 44 of electrically conductive construction is disposed within the cylindrical cavity 46 between retainer 42 and seat 38. The stem 48 of valve element 44 projects into a cylindrical passage 50, which extends from cavity 46 coaxially therewith through end cap 34 to the exterior of the pump. A conical coil spring 52 is captured in compression between retainer 42 and valve seat 38. Coil spring 52 thus urges valve element 44 against seat 38 in opposition to the force of fuel at outlet pressure within pump housing 32. A sleeve 54 of electrically conductive construction surrounds passage 50 remotely of sensor 18. Pump control electronics 20 is mounted on sleeve 54 so as to dissipate heat generated by the electronics to fuel flowing through passage 50.

In operation, pressure sensor valve/switch 18 is in an electrically conductive or closed condition, as shown in FIG. 2, when fuel at outlet pressure within housing 32 is below the pressure threshold determined by spring 52. On the other hand, valve/switch 18 is in the electrically non-conductive or open condition when such outlet fuel pressure exceeds the threshold determined by spring 52 and urges valve element 44 off of seat 38. Valve seat 38 and retainer 42 are electrically connected by suitable conductors to pulse width modulation amplifier 22 (FIG. 1) of control electronics 20 for controlling electrical power applied to the pump as a function of conductive condition of the valve/switch.

In accordance with a distinguishing feature of the present invention, pulse width modulation amplifier 22 is designed to apply pulsed d.c. electrical power to the pump motor at a first pulsed width modulation duty and frequency when pump outlet pressure is below such threshold and valve/switch 18 is closed, and at a second duty cycle and/or frequency less than the first duty cycle and/or frequency when pump outlet pressure exceeds such threshold and valve/switch 18 is open. In the preferred embodiment of the invention, the frequency of the pulsed d.c. energy applied to the motor remains constant, while the duty cycle switches between a first duty cycle when pump outlet pressure is below the valve/switch threshold and a second lesser but non-zero duty cycle when pump outlet pressure is above the valve/switch threshold. The modulation frequency and the two duty cycles are preset in the design of amplifier 22. In this way, electrical energy applied to the pump is automatically reduced when outlet fuel pressure becomes excessive, reducing wear on the pump and heat dissipation by the pump. However, the pump continues to operate at the lesser level, eliminating potential inertia problems when higher pump output is required. Resistor 26 (FIG. 1) limits current conducted through the contacts of valve/switch sensor 18 to reduce pitting and arcing at the switch contacts.

In the embodiment of the invention illustrated in FIG. 2, stem 48 of valve element 44 is sized with respect to the surrounding flow 50 so as to guide motion of valve element 44 while at the same time permitting flow of fuel through passage 50 around stem 48. Such fuel is returned to fuel tank 14 (FIG. 1) in which pump/motor 12 is immersed, while at the same time conducting heat away from control electronics 20 by means of sleeve 54. In the alternative embodiment of FIG. 3, in which elements identical to those in FIG. 2 are indicated by correspondingly identical reference numerals, stem 48 of valve element 44 has a closer sliding fit in passage 50a, and fuel flowing through the valve/switch 18a is returned to the surrounding tank by means of the passages 50b immediately downstream of valve seat 38. FIG. 3 also illustrates electrical tabs 60,62 respectively connected to retainer 42a and seat 38 for connection to control electronics 20 (FIG. 1).

I claim:

1. A fuel delivery system for an internal combustion engine that includes a fuel supply, an electric-motor pump for feeding fuel under pressure from said supply to the engine, and means for applying electrical power to said pump comprising:

pressure sensitive switch means operatively coupled to said pump and responsive to outlet fuel pressure from said pump for switching between conductive and non-conductive switch conditions at a preselected threshold outlet fuel pressure, and pulse width modulation means coupled to said switch means for applying pulsed d.c. energy to said pump at a predetermined first frequency and duty cycle when said switch means is at one said condition indicating that said Dump outlet pressure is below said threshold, and at a predetermined second non-zero frequency and duty cycle, of which either the frequency, the duty cycle or both is less than said first frequency and duty cycle, when said switch means is at the other said condition indicating that said pump outlet pressure is above said threshold, such that electrical power applied to said electric-motor pump is reduced when Dump outlet pressure exceeds said threshold, said electric-motor pump comprising an integral assembly that includes a case and an end cap with said outlet extending from said end cap, said switch means being mounted on said end cap and responsive to fuel pressure within said case, said switch means comprising a pressure valve that includes a valve seat, a valve element and spring means urging said valve element toward said seat against fuel pressure within said housing and blocking flow of fuel through said valve when said valve element is against said seat.

2. A fuel delivery system for an internal combustion engine that includes a fuel supply, an electric-motor pump for feeding fuel under pressure from said supply to the engine, and means for applying electrical power to said pump comprising:

pressure sensitive switch means operatively coupled to said pump and responsive to outlet fuel pressure from said pump for switching between conductive and non-conductive switch conditions at a preselected threshold outlet fuel pressure, and pulse width modulation means coupled to said switch means for applying pulsed d.c. energy to said pump at a predetermined first frequency and non-zero duty cycle when said switch means is at one said condition indicating that said pump outlet pressure is below said threshold, and at the same said first frequency and a predetermined second non-zero duty cycle less than said first duty cycle when said switch means at the other said condition indicating that said pump outlet pressure is above said threshold, such that electrical power continues to be applied to said electric-motor pump at a reduced level when pump outlet pressure exceeds said threshold.

3. The system set forth in claim 1 wherein said first and second frequencies are identical.

4. The system set forth in claim 2 further comprising means connecting said pulse width modulation means to said switch means for limiting current conducted by said switch means in said closed condition of said switch means.

5. The system set forth in claim 2 wherein said electric-motor pump comprises an integral assembly that includes a case and an end cap with said outlet extending from said end cap, said switch means being mounted on said end cap and responsive to fuel pressure within said case.

6. The system set forth in claim 5 wherein said switch means comprises a pressure valve that includes a valve seat, a valve element and soring means urging said valve element toward said seat against fuel pressure within said housing and blocking flow of fuel through said valve when said valve element is against said seat.

7. The system set forth in claim 1 wherein said valve element, said spring and said seat are of electrically conductive construction, and wherein said switch means further includes means electrically connecting said spring means and said seat to said modulation means.

8. The system set forth in claim 7 wherein said connecting means includes means for limiting current flow through said switch means when said valve element is against said seat.

9. The system set forth in claim 7 further comprising means for returning to said supply fuel flowing through said valve.

10. The system set forth in claim 9 wherein said valve further comprises filter means disposed between said seat and the interior of said housing.

11. The system set forth in claim 9 further comprising means of heat conductive construction carried by said end cap for heat transfer contact with fuel flowing through said fuel-returning means, said modulation means being mounted on said means of heat conductive construction.

* * * * *

UNITED STATES PATENT AND TRADEMARK OFFICE
CERTIFICATE OF CORRECTION

PATENT NO. : 5,406,922
DATED : April 18, 1995
INVENTOR(S) : Charles H. Tuckey

It is certified that error appears in the above-identified patent and that said Letters Patent is hereby corrected as shown below:

Col. 4, Line 43, change "Dump" to "pump".

Col. 4, Line 51, change "Dump" to "pump".

Col. 6, Line 5, change "soring" to "spring".

Signed and Sealed this

Twentieth Day of June, 1995

Attest:

BRUCE LEHMAN

*Attesting Officer*   *Commissioner of Patents and Trademarks*